June 9, 1931.  O. M. PETERS  1,809,354
NONSKID ATTACHMENT FOR VEHICLE WHEELS
Filed May 21, 1930
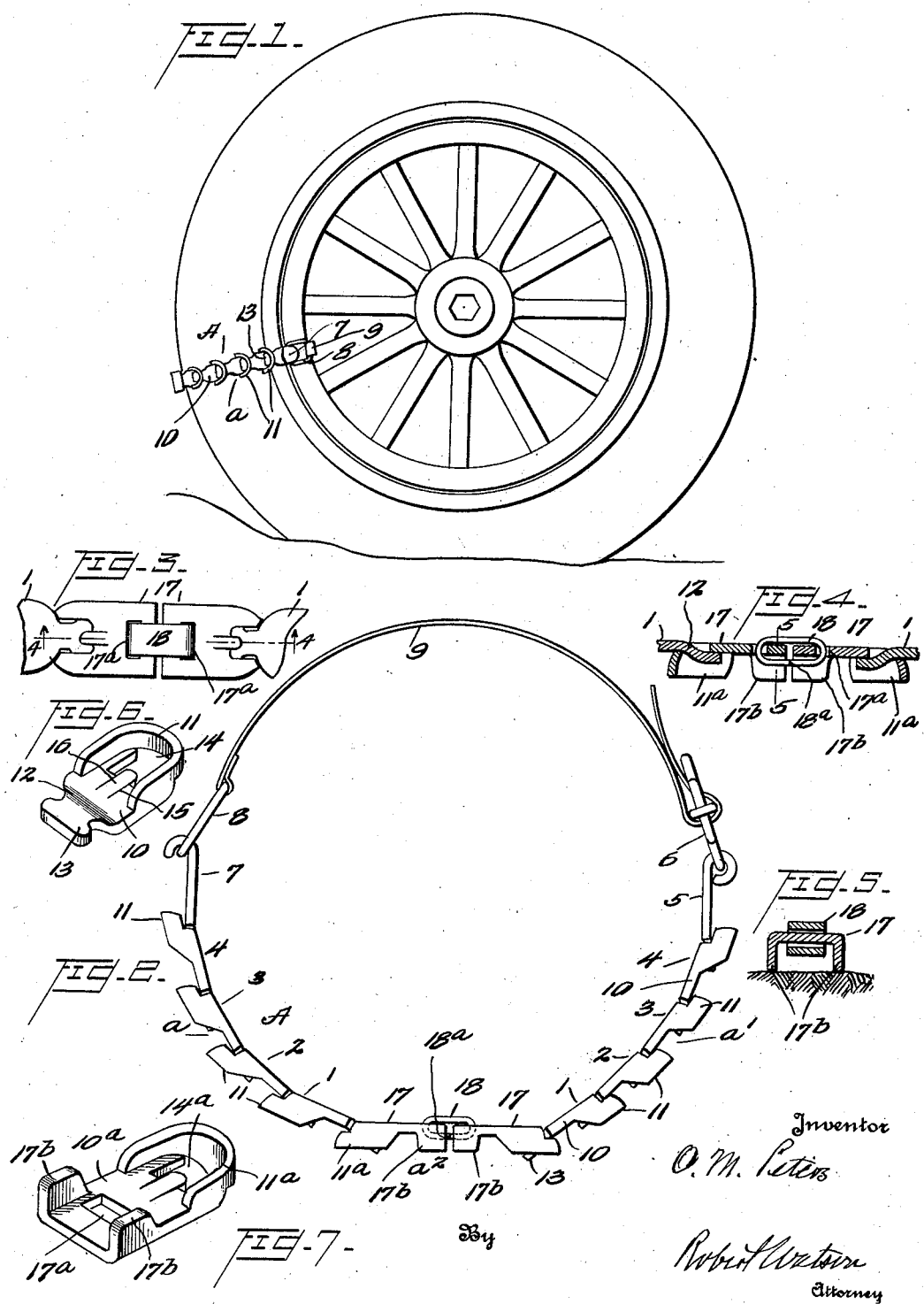

Patented June 9, 1931

1,809,354

UNITED STATES PATENT OFFICE

OSCAR M. PETERS, OF WAYNESBORO, PENNSYLVANIA

NONSKID ATTACHMENT FOR VEHICLE WHEELS

Application filed May 21, 1930. Serial No. 454,382.

This invention relates to non-skid cross chains of the type illustrated in my Patent Number 1,697,821; dated January 1, 1929, in which each link is composed of a relatively flat body having an arcuate flange at one end, and having a headed shank at the opposite end, the shank of each link extending through an opening in the body of an adjacent link and adapted to engage the flange on the latter. A chain composed entirely of such links has ample flexibility when placed upon a tire which is inflated to a relatively high pressure; but with balloon tires which carry a relatively low air pressure, an obstruction upon the road presses the central links of the chain upwardly until they are substantially in line with one another, and at that point heavy stresses come upon the shanks of the central links. This requires making the links of the chain of heavy stock, to prevent breakage of the central links, whereas for the purpose of traction and wear a chain having links made of lighter stock would be quite as satisfactory.

To overcome this difficulty and in order to lessen the cost of manufacture, I have made the side sections of the chains out of links of the kind referred to above and I connect these together by a central section which permits of upward or inward flexibility when passing over obstacles on the road. The central section of the chain is the part which is subject to the hardest usage, but if made very heavy, it is soon damaged or destroyed by the repeated impact against hard pavements as the vehicle wheel revolves. The central section of the chain in the present invention is therefore composed of links which are relatively light in weight, which have ample bearing on the roadway, and which are connected by a relatively light metal loop, the latter being protected against contact with hard pavements by the non-skid flanges of adjacent links.

In the accompanying drawing,

Fig. 1 is a side elevation of an automobile wheel having one of my improved chains thereon;

Fig. 2 is a side elevation of the chain with its securing band;

Fig. 3 is a plan view of the central portion of the chain, showing the side which fits against the tire;

Fig. 4 is a section on the line 4—4 of Fig. 3;

Fig. 5 is a section on the line 5—5 of Fig. 4;

Fig. 6 is a perspective view of one of the side links of the chain; and,

Fig. 7 is a similar view of one of the central links.

Referring to Figs. 1 to 4, inclusive, of the drawings, A indicates cross chains composed of side sections $a$ and $a'$ and a central section $a^2$. The side sections are alike, each composed of a suitable number of non-skid links, 1, 2, 3, and 4, like the links shown in Fig. 6, and each section having also a link composed of a metal strip by which it may be attached to a side chain or a band for securing the cross chains to a wheel. One of these attaching links 5 is shown with an eye to which a buckle 6 is connected, and the other link 7 is provided with a hooked end to receive a metal ring 8 on the end of a flexible band 9, which band is threaded through the buckle. Each non-skid link in the side sections comprises a flat body portion 10 having one end rounded and having an arcuate flange 11, projecting from said rounded end, and a shank 12, having a head 13, projects from the opposite end of the body portion. In the body portion, adjacent the flange, is an opening 14, and a slot 15, adapted to be closed by a tongue 16, intersects the opening 14. The arrangement is such that the head of one link may be passed through the opening and when the tongue 16 is pressed downwardly the head of one link becomes interlocked with the adjacent link. These non-skid links in the side sections are substantially the same as the links in the cross chains shown in the aforesaid patent.

A chain composed entirely of links such as that shown in Fig. 6, when arranged upon a tire, is flexible when subjected to pressure from the tire at the rear sides of the links, but when subjected to pressure from a stone or other obstacle on the road which would bring the links into line with one another, the links reach their limit of inward flexibility and hence a severe stress is put upon the shanks of the central links, and it is therefore necessary to make the entire chain of heavier material, to withstand breakage, than if the chains had more inward flexibility at its central portion.

To provide for this inward or upward flexibility, the links in the side sections $a$ and $a'$ are reversely arranged, as shown, the shanks of the links in the two sections pointing in opposite directions, and the inner end links 1 of the side sections are connected together by two non-skid links 17 and a loop 18, which constitute the central section of the cross chain. Each link 17, as shown in Fig. 7, comprises a flat body portion $10^a$, having an arcuate flange $11^a$ at one end, and an opening $14^a$ adjacent the flange for receiving the headed shank of a link in the side section. A transverse slot $17^a$ is formed in the body portion near the end which is opposite the arcuate flange, and flanges $17^b$ project from the sides of the body portion at the latter end. The loop 18 is composed of a flat strip of metal which is extended through the openings $17^a$ in the adjacent links 17 and is bent into the form of an oblong loop. In applying this loop 18, its ends are passed through the openings from the sides of the links which bear against the tire, and the ends of the loop are brought together on the sides which face the roadway, as indicated at $18^a$. As shown in Figs. 2, 4 and 5, the flanges $17^b$ project from the body considerably beyond the loop 18 and thereby protect it from coming in contact with the hard roadways. The loop link 18 is arranged with its meeting ends at the sides of the links nearest the roadway so that when the flanges $17^b$ become worn down to such an extent that the link 18 will engage the roadway and wear, the latter link will hold the links 17 together, even when the meeting ends of the link 18 are practically worn off. If the link 18 were reversely arranged its central part would wear through, after the wearing of the flanges $17^b$ and the link 18 would then fall apart. The flanges $11^a$ and the flanges $17^b$ afford wide non-skid bearing surfaces for the links at the central portions of the chains where the greatest weight and greatest traction effort are applied.

What I claim is:

A non-skid cross chain comprising two side sections each composed of a plurality of similar links, the links in the side sections being reversely arranged, each of said links comprising a relatively flat body portion having an opening therethrough and having a flange at one end and a headed shank at the opposite end, the shank of each of said links extending through the opening in an adjacent link, and a central section comprising two similar oppositely arranged links each of the last mentioned links comprising a flat-body portion having at one end a flange and a slot similar to the flanges and slots in the links of the side sections, said slots in the central links each adapted to receive the headed shank of an adjacent side link, said central links being formed at their opposed ends with transverse slots and side flanges, and a flat metal loop extending through said slots, said side flanges projecting beyond the loop to protect the latter from wear on the roadway.

In testimony whereof I affix my signature.

OSCAR M. PETERS.